(12) United States Patent  
Slater

(10) Patent No.: US 7,827,814 B2  
(45) Date of Patent: Nov. 9, 2010

(54) GEOTHERMAL WATER HEATER

(76) Inventor: Hal Slater, 3604 Nile St., San Diego, CA (US) 92104

(*) Notice: Subject to any disclaimer, the term of this patent is extended or adjusted under 35 U.S.C. 154(b) by 0 days.

(21) Appl. No.: 12/540,288

(22) Filed: Aug. 12, 2009

(65) Prior Publication Data

US 2010/0230071 A1 Sep. 16, 2010

(51) Int. Cl.
F25B 27/00 (2006.01)
(52) U.S. Cl. ........................ 62/235.1; 62/260
(58) Field of Classification Search .......... 62/260, 62/238.6, 3.2, 3.3, 3.7, 235.1, 434; 165/45, 165/48.1, 48.2, 299
See application file for complete search history.

(56) References Cited

U.S. PATENT DOCUMENTS

| | | | |
|---|---|---|---|
| 3,786,858 A * | 1/1974 | Potter et al. ............ 165/45 |
| 3,961,866 A | 6/1976 | Nichols |
| 4,047,093 A | 9/1977 | Levoy |
| 4,062,489 A | 12/1977 | Henderson |
| 4,068,651 A | 1/1978 | Rappaport |
| 4,102,133 A | 7/1978 | Anderson |
| 4,220,205 A * | 9/1980 | Coursen et al. ........ 166/299 |
| 4,241,588 A * | 12/1980 | Murphy et al. ........ 62/238.1 |
| 4,382,368 A | 5/1983 | Dittell |
| 4,574,875 A | 3/1986 | Rawlings |
| 4,633,676 A * | 1/1987 | Dittell ................ 62/238.6 |
| 4,792,059 A * | 12/1988 | Kerner et al. ............ 222/67 |
| 4,979,374 A * | 12/1990 | Kabakov et al. ........ 62/238.2 |
| 5,224,357 A | 7/1993 | Galiyano |
| 5,395,451 A * | 3/1995 | Triculis ................ 118/666 |
| 5,573,142 A * | 11/1996 | Morellato et al. ...... 222/129.1 |
| 5,575,159 A * | 11/1996 | Dittell .................. 62/199 |
| 5,660,165 A * | 8/1997 | Lannes .................. 126/641 |
| 5,706,888 A | 1/1998 | Ambs |
| 5,758,514 A | 6/1998 | Genung |
| 5,868,062 A * | 2/1999 | Enomoto .............. 62/238.6 |

(Continued)

FOREIGN PATENT DOCUMENTS

JP    10-38431    *  2/1998

(Continued)

OTHER PUBLICATIONS

Abstract of JP 2007-327679 A to Takai, Kazuo.*

(Continued)

Primary Examiner—Mohammad M Ali  
(74) Attorney, Agent, or Firm—Law Office of David L. Romero

(57) ABSTRACT

The present invention relates to a geothermal water heater system, and methods of heating water for domestic uses utilizing geothermal energy. More specifically, the present invention provides a geothermal heat pump water heater system includes a hot water tank, a cold water tank and at least one water-to-water heat pump. As contemplated, the water-to-water heat pump includes one or more heat exchangers which control heat transfer from water drawn from an outside water source. The outside water source water is supplied to both the hot water tank and the cold water tanks whereupon heat exchangers which comprise a cold water side heat exchanger and a hot water side heat exchanger, allow water entering the cold water tank to be cooled and returned to the cold water tank while water entering the hot water tank is heated and returned to the hot water tank.

16 Claims, 8 Drawing Sheets

U.S. PATENT DOCUMENTS

| | | | |
|---|---|---|---|
| 6,098,404 A * | 8/2000 | Armstrong | 60/531 |
| 6,138,744 A | 10/2000 | Coffee | |
| 6,212,890 B1 | 4/2001 | Amir | |
| 6,347,527 B1 * | 2/2002 | Bailey et al. | 62/238.7 |
| 6,694,739 B2 * | 2/2004 | Beckius et al. | 60/645 |
| 6,907,734 B2 | 6/2005 | Shinohara | |
| 7,234,314 B1 | 6/2007 | Wiggs | |
| 7,334,419 B2 | 2/2008 | Gordon | |
| 2003/0010652 A1 | 1/2003 | Hunt | |
| 2003/0066638 A1 * | 4/2003 | Qu et al. | 165/186 |
| 2003/0070430 A1 * | 4/2003 | Beckius et al. | 60/645 |
| 2003/0159457 A1 * | 8/2003 | Faqih | 62/285 |
| 2006/0005561 A1 * | 1/2006 | Murphy et al. | 62/285 |

FOREIGN PATENT DOCUMENTS

JP    2007-327679 A  * 12/2007

OTHER PUBLICATIONS

Abstract of JP 10-38431 A to Yoshimoto.*
Moran and Shapiro, Design and Open Ended Problems (textbook), p. 79.
ASHRAE Standard, Method of Testing for Rating Residential Water Heaters, ASHRAE, Jan. 21, 2006, published in U.S.

* cited by examiner

GEOTHERMAL WATER HEATER

FIELD OF THE INVENTION

The present invention relates generally to a device and methods for heating water and more specifically to a device which utilizes geothermal energy in water from the supply source to heat water for domestic use.

BACKGROUND OF THE INVENTION

Heat pump technology is well accepted to be more energy efficient by transferring heat from air or water to air or water using common refrigeration technology. Water-based heat transfer is inherently more efficient that air-based transfer due to the higher density of water with more mass to carry heat. Water-to-water heat pumps are the most efficient of all heat pump designs, thus the growing popularity of geothermal heating and cooling systems which move heat to or from the mass of the earth versus the more common air-to-air outdoor compressor. The energy savings can be as high as 70% for home heating or cooling. Heat pump water heaters provide energy and a cost efficient way to heat water with electricity. These types of heaters typically provide the same amount of hot water as electric resistance heaters, but do so at one-half to one-third the energy cost. Heat pump water heaters may also have the added benefit of providing air-conditioning as a by-product of water heating.

Heat pump water heaters work by transferring heat, not by generating heat. Typically, a heat pump water heaters uses a standard vapor refrigeration compression cycle in reverse, In this manner, a heat pump water heater uses a closed-loop heat exchange circuit to absorb heat from a source (such as air in a room) and transfers the heat to a heat sink (such as water in a water storage tank). The energy consumed in a heat pump water heater system is the energy to run a compressor to circulate the refrigerant in the heat exchange circuit.

U.S. Pat. No. 7,334,419 describes such a heat pump water heater which generally relates to a water heater that heats water in a storage tank and heating or cooling ambient air. However, similar heat pump water heaters often require expensive installation procedures and do not address the shortcomings of reducing overall heating costs for domestic water uses.

Other heating and cooling strategies include devices which rely on low pressure geothermal steam and a turbo generator to which steam is applied. U.S. Pat. No. 6,212,890 describes a geothermal power plan and condenser which utilizes such a system in producing energy. The low pressure geothermal steam is applied to the turbine, wherein expansion takes place driving the generator, and producing expanded steam that is exhausted from the turbine. A condenser for condensing the expanded steam includes a steam heat exchanger for receiving the expanded steam and a fan for cooling the expanded steam. One shortfall of such devices however, is the need for a constant source of geothermal steam as a power source as well as the costs associated with maintaining steam driven turbines and condensers.

Similarly, U.S. Pat. No. 4,102,133 describes a multiple well dual fluid geothermal power generator which purportedly transfers heat by exchange into a power fluid cycle, at different points in the cycle. The end result being an increase in the amount of power which can be developed per unit of geothermal fluid supplied. However, as with the '890 patent, this device requires a constant source of geothermal steam as well as the maintenance costs associated with such a device.

U.S. Pat. No. 7,234,314 describes a geothermal heating and cooling system with solar heating, which purportedly improves the efficiency and installation costs functionality of predecessor geothermal heat exchange designs for closed-loop water source heat pump systems, and for direct expansion heat pump systems. As described, efficiency is improved by means of a solar heat collector solar system that is operatively connected to a new, or to an existing, geothermal direct expansion, or closed-loop water-source, heat pump system so as to provide supplemental heat in the heating mode, when advantageous, by means of natural solar heat collector fluid convection. Such systems however, only provide a supplemental source of solar heating to new or existing geothermal direct expansion, or closed-loop water-source heat pump systems.

Likewise, U.S. Pat. No. 4,382,368 provides a geothermal hot water system which includes a hot water tank and a warm water tank which are heated independently of each other by a close loop Freon system. The closed loop Freon system includes a main condenser which heats water for the warm water tank and a super-heated condenser which heats water for the hot water tank. Generally, the hot water system extracts heat from a water main such as well water which is subsequently discharged with no environmental change and is carried to the water to be heated by condensing liquid such as Freon.

Typically, electric water heaters are very expensive to operate, requiring 4,000 kWh per year or $60.00 to $120.00 per month for a family in most areas. The present invention would cost about one-fourth of that which is the same as, or less than, a natural gas water heater costs to operate.

When it is available, natural gas is the most popular choice of fuel for water heating because it costs less than electricity. Natural gas is not available in all areas and requires a costly infrastructure element to add to a community. While currently less expensive to operate, natural gas water heaters unavoidably create carbon dioxide emissions. Electric water heaters can be powered with carbon-free fuel.

Ground source heat exchange systems typically utilize liquid-filled closed loops of tubing buried in the ground, or submerged in a body of water, so as to either absorb heath from, or to reject heat into, the naturally occurring geothermal mass and water surrounding the buried or submerged tubing. Contrary, water-source heat pump heating and cooling systems typically circulate water, or water with anti-freeze, in plastic underground geothermal tubing so as to transfer heat to or from the ground, with a second heat exchange step utilizing a refrigerant to transfer heat to or from the water, and with a third heat exchange step utilizing a compressor and an electric fan to transfer heat to or from the refrigerant to heat and cool interior space. Further, water-source heating and cooling systems typically utilize closed-loop or open-loop plastic tubing.

Closed-loop systems, often referred to as ground loop heat pumps, typically consist of a supply and return, ¾ inch to 2 inch diameter, plastic tube, joined at the extreme ends via an elbow, or similar, connection. The plastic tubing is typically of equal diameter, wall thickness, and composition, in both the supply and return lines. The water is circulated within the plastic tubing by means of a water pump. In the summer, interior space heat is collected by a common interior compressor and air heat exchanger system, or air handler, and is rejected and transferred into the water line via a refrigerant line to water line heat exchanger. In a similar manner in the winter, heat is extracted from the water line and transferred to the interior conditioned air space via the refrigerant liquid within the refrigerant line being circulated in a reverse direction. Many such systems are designed to operate with water temperature ranges of about a 10° F. water temperature differential between the water entering and exiting the heat exchange unit's copper refrigerant transport tubing. Water temperatures are often designed to operate in the 40 to 60° F. range in the summer and in the 25-45° F. range in the winter with anti-freeze added to the water.

In cases where a 1.5 inch diameter, plastic water conducting tubing is installed in a horizontal fashion about 5 or 6 feet deep, in 55° F. ground, about 200 to 300 linear feet per ton of system capacity may be necessarily excavated. If the same closed-loop plastic water conducting tubing is installed in a vertical borehole in 55° F. ground, about 150 to 200 feet per ton of system capacity may be drilled. In the horizontal style installation, the plastic tubing loop is typically backfilled with earth. In the vertical style installation, the plastic tubing loop inserted into the typical 5 to 6 inch diameter borehole is generally backfilled with thermally conductive grout. In either the horizontal or vertical style installation, a water pump is required to circulate the water through the tubing lines, which are generally of equal diameter in both the supply and return segments.

The basic operation of a heat pump water heater (HPWH) can be readily understood by examining it as a black box, without regard to the inner workings. Using this simplified approach, three energy flows, 1) heat removal (i.e. cooling), 2) electric energy and 3) water heating, are involved with a typical HPWH. The HPWH consumes electric energy and it removes heat from the heat source, producing a cooling effect. The energy gained is then delivered by the HPWH as heating output. For an air-source HPWH, the heat source is usually warm, humid interior air. Water-source heat pumps usually rely on a chilled water loop or a cooling tower loop as a heat source.

The electric energy input results in two useful effects: cooling and heating. The heating output (electrical input+heat removed from the heat source) is applied toward a water heating load. The cooling output is often used to cool and dehumidify the interior of a building. Since HPWHs have efficiencies greater than 100%, water heating efficiency for a HPWH is described by the coefficient of performance or COP, instead of using the term "efficiency." The water heating COP is the ratio of the useful water heating output to the electric energy input.

Under typical conditions, an air-source HPWH delivers about 10,000 Btuh of water heating for every kilowatt of electric power it uses. It typically achieves a maximum temperature of about 130-150° F. depending on the refrigerant used. While heating water, the HPWH also provides a cooling effect of about 6700 Btuh per kilowatt. Like a conventional air conditioner, typically about 75% of the cooling output is sensible cooling and 25% is latent cooling or dehumidification at standard rating conditions.

The fundamental principles of operation for a HPWH are the same as those of a room air conditioner, a refrigerator, or an air-to-air heat pump. The basic functional components of a heat pump water heater are the evaporator, compressor, condenser, and expansion device.

Heat is transferred by the flow of refrigerant, taking advantage of the large amount of heat absorbed and released when the refrigerant evaporates and condenses. The flow of refrigerant is caused by the pressure differential created by the compressor. The compressor and condenser operate at higher pressure; that portion of the refrigeration system is called the high side. The portion containing the evaporator and the expansion device is called the low side. The compressor pulls refrigerant from the evaporator on the low side and discharges it to the condenser on the high side, much like a pump lifting water uphill. The expansion device resists the flow of refrigerant back to the low side, maintaining the pressure differential.

The refrigeration cycle is best understood by following a portion of the refrigerant around the cycle. The processes that occur in the major components are described in the following paragraphs.

Drawn by the compressor, refrigerant gas (vapor) leaves the evaporator at low pressure and low temperature and flows through the suction line to the compressor. As the compressor compresses the vapor to a higher pressure, its temperature rises (in the same manner as a bicycle pump becomes warm when pumping up a tire). Refrigerant leaves the compressor as a high-temperature gas at high pressure.

The compressor pushes hot, high-pressure refrigerant through the discharge line to the condenser. The condenser is simply a heat exchanger that removes heat from the hot gas and releases it to a heat sink (for HPWHs, the water being heated). The removal of heat from the hot gas causes it to condense to a liquid. Refrigerant leaves the condenser as an intermediate-temperature liquid at high pressure.

Liquid refrigerant flows from the condenser through the liquid line to the expansion device. By acting as a flow restrictor, the expansion device maintains high pressure on the condenser side and low pressure on the evaporator side. In larger commercial heat pump water heaters, the expansion device is an expansion valve. In smaller systems, it may be a capillary tube.

As the liquid moves through the expansion device, its pressure is suddenly lowered. The pressure drop causes some of the liquid refrigerant to flash (evaporate very quickly) into vapor. The evaporation of a portion of the liquid cools the remaining liquid, in the same way evaporation cools your skin when you step out of the shower. Refrigerant leaves the expansion device as a low-temperature mixture of gas and liquid at low pressure.

The cold, low-pressure mixture of liquid and gas refrigerant then flows to the evaporator. The evaporator is another heat exchanger that allows heat to move from a heat source (the air inside a building for most air-source HPWHs) to the refrigerant. As the liquid refrigerant evaporates to a gas, the evaporator removes heat from the heat source. The evaporator in an air-source HPWH provides a cooling and dehumidification effect for the building interior as the evaporator removes heat from the air. Dehumidification takes place only when the evaporator surface temperature is below the air's dewpoint temperature, allowing moisture to condense. Refrigerant leaves the evaporator as a low-temperature gas at low pressure, completing the cycle. The cycle is continuous while the machine is in operation, with refrigerant continuously moving through each part of the system.

A typical HPWH operating at normal conditions delivers about 10,000 Btuh of water heating for every kilowatt of electric power input (the equivalent of 3413 Btuh). About 15 gallons of water can be heated per hour through a temperature change of 80° F. The coefficient of performance for water heating is 10,000/3413 or about 2.9. In addition, about 6600 Btuh of cooling and dehumidification capacity is delivered for the same one-kilowatt input. This may be a desirable effect depending upon climate, season and location in house.

These rule-of-thumb values agree closely with the actual specifications for most specific HPWHs applied in typical conditions. As an example, one commercially available HPWH model uses five thousand Watts (17,100 Btuh) of electric power to deliver 50,000 Btuh of water heating and 31,500 Btuh of cooling. A total of 81,500 Btuh of useful heat flow is provided.

Coefficient of Performance (COP) is simply a measure of efficiency or the amount of useful output achieved for a given input. For example, an air-to-air heat pump might operate at a COP of three under favorable heating season conditions. This equates to a delivery of three units of heat to the building interior for each unit of energy consumed as electric energy.

HPWHs and other refrigeration devices are able to move more energy than they consume by taking advantage of the large amount of heat absorbed and released when the refrigerant evaporates and condenses. Air conditioners, refrigerators, freezers, and air-to-air heat pumps all operate similarly, with COPs normally about 1.7 to 3.2. However, they obtain a useful benefit only on one end of the heat transfer process HPWHs use a small amount of electricity to upgrade the temperature of a large amount of heat and deliver it to meet a thermal load. The water heating efficiency of a heat pump water heater is always greater than 100%, and usually substantially greater. In addition to the water heating output, HPWHs often provide a cooling effect with no additional energy input.

At one-fourth the electric demand, the present invention allows less cost to power the geothermal water heater with photovoltaic panels as part of a grid connected PV system than to install a separate solar thermal system for water heating. Additional designs using a solar thermal heat source are also possible with the effect of significantly increasing solar performance by decreasing electric backup used and lowering the panel operating temperature.

The invention can also be installed in the place of most natural gas water heaters due to the lower electric service requirement for the heat pump which can operate on a standard 15 A-120V circuit. Otherwise, changing to electric water heating would require the installation of at least a 20 A-240V circuit, if available.

SUMMARY OF THE INVENTION

The present invention relates to a geothermal water heater system, and methods of heating water for domestic uses utilizing geothermal energy. More specifically, the present invention provides a geothermal heat pump water heater system including, in part, a hot water tank, a cold water tank and at least one water-to-water heat pump (WWHP). As presently contemplated, the water-to-water heat pump includes one or more heat exchangers which control the transfer of heat from water drawn from an outside water source. The outside water source water is supplied to both the hot water tank and the cold water tanks whereupon heat exchangers which include a cold water side heat exchanger and a hot water side heat exchanger, allow water entering the cold water tank to be cooled by the cold water side heat exchanger and returned to the cold water tank while water entering the hot water tank is supplied to a hot water side heat exchanger and returned to the hot water tank following heating. The present invention further relates to a geothermal water heater system which utilizes a thermoelectric water-to-water heat pump to heat water.

DETAILED DESCRIPTION OF THE INVENTION

Figure 1:
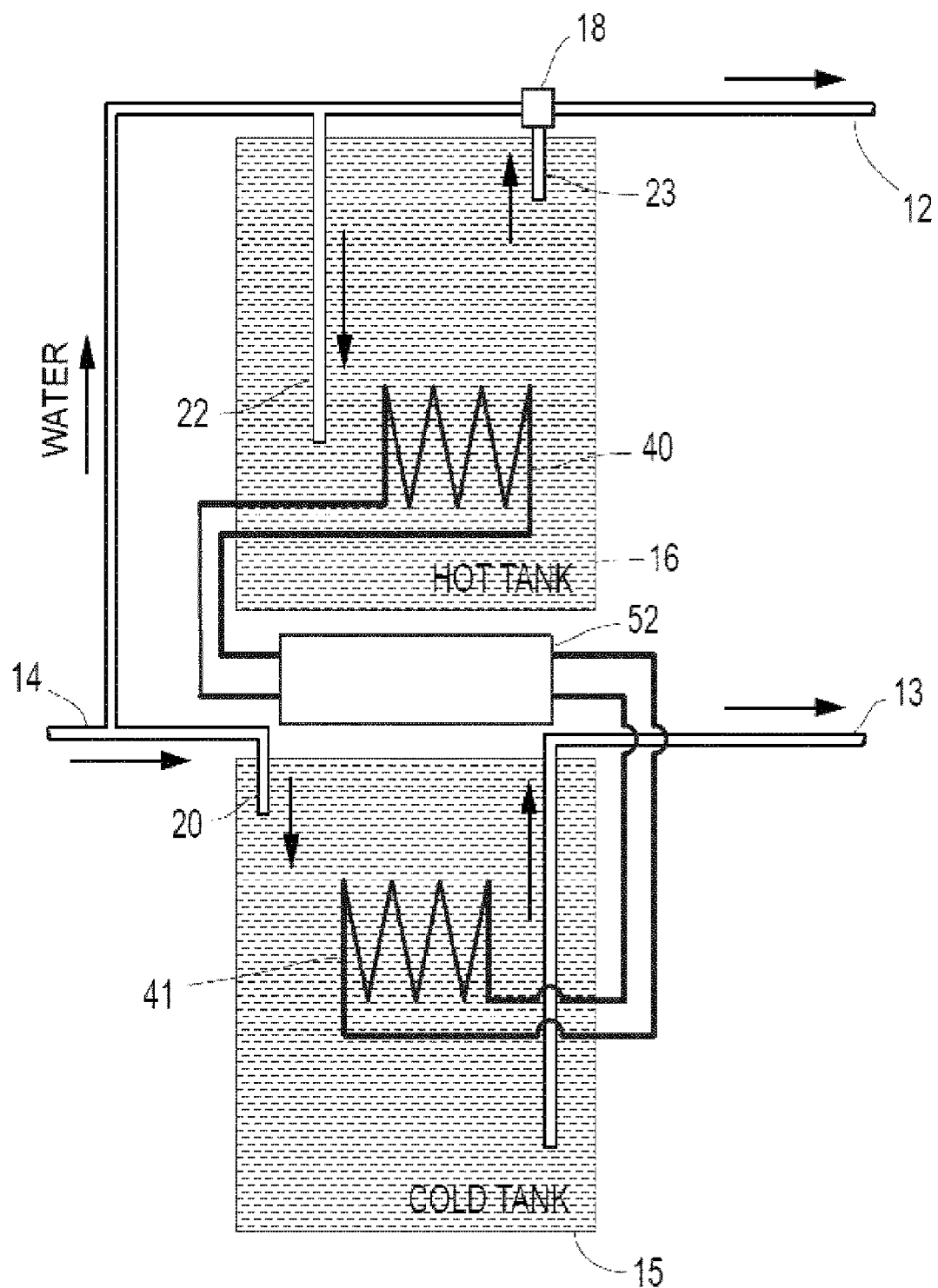
FIG. 1 depicts the basic configuration without solar assist showing heat pump 52, tanks and heat exchangers immersed into the tanks to transfer heat. Incoming water at ground temperature is diverted to both tanks wherein the available heat is absorbed and used to heat the hot water.

Current methods of utilizing geothermal heating technology include use of de-superheaters, which employ use of heat exchangers which extract heat from air sources. An inherent property of water to water heat exchange is greater efficiency. Water to water technology utilizes less electricity to heat water, produces less noise and requires less maintenance to operate. An added consequence of utilizing air to water devices results in a cooling of the volume area surrounding the device.

Accordingly, the invention relates to a geothermal heater system which utilizes a hot water tank, a cold water tank, a means for controlling temperature generated by the heater system, a water-to water heat pump and optionally, an antiscald valve. The geothermal heater system is further includes a heat exchange means and optionally, a solar panel or solar controlled loop. Optimal Coefficient of Performance (COP) of between 3.9 and 6.0, which will generate heated water at a temperature of up to 120° F. and cold water to 45° F.

The term "geothermal power" as used herein refers to is power extracted from heat stored in the earth. For example, such energy originates from the original formation of the planet, from radioactive decay of minerals and from solar energy absorbed at the surface of the earth. Generally, geothermal power will be appreciated by those in the art for direct applications such as home heating.

The term "heat pump" as used herein refers to a machine or device that moves heat from one location to another location. More specifically, the majority of heat pump technology involves movement of heat from a low temperature heat source to a higher temperature heat sink. For example, common heat pumps include but are not limited to food refrigerators and freezers, air conditioners and reversible-cycle heat pumps for providing domestic heating.

A heat pump, known to those in the art, is an electrical device that extracts heat from one place and transfers it to another. Most heat pumps transfer heat by circulating a substance called a refrigerant through a cycle of alternating evaporation and condensation. A compressor pumps the refrigerant between two heat exchangers. In one heat exchanger, the evaporator, the refrigerant is evaporated at low pressure and absorbs heat from its surroundings. The refrigerant is then compressed en route to the heat exchanger, the condenser, where it condenses at high pressure. At this point, it releases the heat it absorbed earlier in the cycle.

The main components in a water-to-water heat pump are the compressor, the expansion valve and two heat exchangers; one containing the evaporator and another containing condenser. Liquid is circulated through the heat exchangers to capture, condense and transfer the heat from one fluid to the other.

Using an inverter-driven heat pump compressor motor, the system can be regulated so that heat output matches the exact capacity required at any given time. This means the heat pump will only consume the exact energy needed, making it even more efficient.

The term "open loop" as used herein refers to a geothermal source which utilizes water from a domestic well or other water source.

The term "closed loop" as used herein refers to a geothermal source which utilizes mostly commonly, polyethylene piping buried or drilled into the ground, filled with a water/anti-freeze solution. The loop fluid circulating in this closed piping system absorbs heat or rejects heat into the surrounding earth.

The term "controller" as used herein refers to any device which is able to modulate or adjust the level of fluid passing in a given area by either electronic or manual means. Specifically, a controller refers to a generic control loop feedback mechanism widely used in industrial numerous control systems. Generally, a controller may be defined by a device that attempts to correct the error between a measured process variable and a desired set point by calculating and then outputting a corrective action that can adjust the process accordingly and rapidly, to keep the error minimal.

The term "heat exchanger" as used herein refers to a device built for efficient heat transfer from one medium to another, whether the media are separated by a solid wall so that they never mix. Alternatively, the media may be in direct contact. Examples of heat exchangers include but are not limited to, space heaters and refrigeration and air conditioning units. One common example of a heat exchanger is the radiator in a car, in which the heat source, a hot engine-cooling fluid such as water, transfers heat to air flowing through the radiator.

With regard to the present invention, heat exchangers may be designated as either a cold water side heat exchanger or hot water side heat exchanger. A cold water heat exchanger is one wherein water entering the cold water tank is cooled by the cold water side heat exchanger and returned to the cold water tank. Alternatively, a hot water side heat exchanger is one which allows water entering the hot water tank to be supplied to a hot water side heat exchanger, the heated water being returned to the hot water tank As referred to in the present invention the heat pump(s) may be composed of a cold water side heat exchanger, in which the heat exchanger is employed to cool water in the cold water storage tank or alternatively, the heat pump may be comprised of a hot water side heat exchanger, in which the heat exchanger is employed to heat water in the hot water storage tank.

The term "tank" as used herein refers to a holding vessel utilized to store water, ranging in various temperatures. Generally, as will be appreciated by those in the art, a tank will be comprised of several types of materials and in a variety of volumes.

The term "solar collector loop" as used herein refers to a device comprised generally of three components, a transparent cover, tubes or lines which carry a coolant and an insulated back plate. The solar collector is generally understood to on the principle of the green house effect. Specifically, solar radiation incident upon the transparent surface of the solar collector is transmitted through the surface. The inside of the solar collector is generally insulated so the trapped energy contained within the solar collector heats the cooler liquid or material within the tubes. The tubes are generally made of copper, and the backplate is generally black to absorb solar radiation. As will be appreciated by those skilled in the art, several variations of the solar collection loop may be employed and are within the scope of the present invention. The solar collection loop of the present invention may act in providing a supplemental heating capacity to water contained with the cold and hot water tanks.

The term "solar panel" as used herein will be understood by those skilled in the art and refers to a device which generates power from the sun by converting sunlight to electricity with no moving parts, zero emissions, and generally no maintenance. The solar panel, the first component of an electric solar energy system, is a collection of individual silicon cells that generate electricity from sunlight. The photons (light particles) produce an electrical current as they strike the surface of the thin silicon wafers. A single solar cell produces about 3 Watts at 1 volt. However, a typical 12 volt panel about 40 inches by 60 inches will contain 36 cells wired in series to produce about 34 volts peak output. If the solar panel can be configured for 24 volt output, there will be 72 cells so the two 12 volt groups of 36 each can be wired in series, usually with a jumper, allowing the solar panel to output 24 volts. When under load (charging batteries for example), this voltage drops to 22 to 26 volts (for a 24 volt configuration) resulting in 150 to 200 watts for a panel of this size. The solar collection loop of the present invention may act in providing a supplemental heating capacity to water contained with the cold and hot water tanks The term "source water", "water source", "outside water source" or "source" as used herein, refer to water originating from an outside source and which is drawn into the water heater system of the present invention. Such water will be drawn into and contained within the cold and hot water tanks. Examples of such source water may be water collected from any ground water sources such as through well water or a ditch, or other sources, including municipal sources, that may be readily available.

The invention is generally comprised of two water tanks connected together with a water-to-water heat pump (WWHP) to extract heat from (or cool) the water in one tank to heat the water in the other. The hot water tank is intended to supply heated water for common domestic uses while the cold water tank is simply installed in-line with the home's cold water plumbing circuit. Approximately 20° F. of heat in the cold water supply is used to raise the hot water temperature 60° F. The invention utilizes geothermal energy available in the cold water supply which comes from the ground in which the supply lines are buried plus the fact that the average household use three times as much cold water as hot water.

The hot water tank holds water to be heated and retains the heated water for domestic uses, this tank, optionally, contains a backup resistance heating element to assure that hot water is available on a continual basis.

Encompassed in the present invention is a water-to-water heat pump. The heat pump compressor has an electrically powered motor driving vanes or pistons to compress a refrigerant which causes the refrigerant to rise in temperature quickly due to its low specific heat. This releases the heat that was absorbed by the refrigerant as it condensed from a gas to a liquid. Hot, compressed refrigerant passes through one side of a heat exchanger while water passes through the other side of the heat exchanger to absorb the heat from the refrigerant.

After being cooled by the heat exchanger, the heat pump expansion valve (or capillary) releases the compressed refrigerant causing it to vaporize rapidly which, in turn absorbs a great deal of energy creating a large, rapid temperature drop in the refrigerant. The cold refrigerant passes through one side of a heat exchanger while cold water passes through the other side of this heat exchanger. As a result, the refrigerant can absorb heat from the ground temperature water causing the refrigerant to condense from a gas to a liquid before it re-enters the compressor 29. Cold water circulates to the cold side of the heat exchanger by way of a water pump that generates a high enough rate of flow to deliver the energy from the water at the rate at which it can be absorbed by the refrigerant. Hot water circulates to the hot side of the heat exchanger using a pump with the capacity to deliver water flow at the rate at which the heat can be absorbed by the water.

The overall process in practicing the present invention begins with cold water from the utility water supply, or other source such as direct ground water, entering the system at ground temperature of 55°-70° F. and is supplied to the optional mixing valve 18, the cold water tank 16 and the hot water tank 15. This minimizes the temperature rise and energy required for the hot water system to deliver 120° F. water which is considered by the US Consumer Product Safety Council to be the maximum safe delivery temperature. The amount of source water required to practice the invention equal to at least three times the demand amount of water to be heated.

Ground temperature water enters the cold water storage tank 15 via an inlet line 20. Water drawn from the top of this tank and the incoming water supply (under demand conditions) is supplied to the heat pump by a small circulator 27 and pumped into one side of the cold side heat exchanger of the water-to-water heat pump 41. (See FIG. 3) This water is cooled even further in this heat exchanger whose other side carries the super-cooled refrigerant that has just been released by the expansion valve 25. Supply water for the heat exchanger is drawn from the top of this tank to maximize the effects of stratification which increases system efficiency by raising the temperature differential across the heat exchanger.

The cold water in this storage tank can be cooled to 42° F. within the operating limits of typical refrigerants although, for comfort, most users would set the low limit of this tank to 45°-50° F. A simple set point thermostat will automatically turn the heat pump off at a preset, adjustable low point. Cold water is returned from the heat pump to the bottom of the storage tank 15 to further enhance stratification. The outlet 13 to the cold water supply to the house is drawn from the bottom of this tank to deliver the coldest water to the house. This will maintain stratification and raise the tank temperature, making more heat available for the heat pump.

On the hot water side, water from the utility water supply 14 is directed to the bottom of the hot water storage tank 16. Water drawn from the bottom of this tank is supplied to the heat pump by a small circulator 26 and is pumped into an isolated side of the hot side heat exchanger 40 of the heat pump. The compressed refrigerant rises in temperature as its pressure increases and this heat is absorbed from the other isolated side of this heat exchanger by the water from the hot water tank. Hot water in the storage tank is maintained by a set point thermostat at 120° F. to 150° F. depending upon anticipated demand and tank size. Using an optional mixing valve, the water temperature can be safely limited and the effective volume increased. Above 120° F., each 1° F. of tank temperature increases the effective storage by 0.8 gallons. This tank may optionally, have an additional electric resistance element to back up the heat pump in the event that either the cold water demand or ground water temperature are too low. Hot water from the heat pump returns to the top of the storage tank 16 to support stratification. The supply to the house is drawn from the top of the tank to assure that the hottest water in the system is available for use in the house.

The optional mixing or anti-scald valve 18 blends hot and cold water for a consistent delivery temperature of no more than 120° F. to comply with safety requirements that apply when the tank temperature can rise above 120° F. This allows the system to "bank" heat when cold water use is high so that the heat can be readily available when hot water demand is high.

In a preferred embodiment of the invention, the cold water tank holds cold water from the incoming supply to be chilled to provide heat to the hot water tank. The heat pump extracts heat from the cold water to provide heat to the hot water. The thermal controller manages the energy used in the system to provide a reliable supply of hot water without overcooling the cold water. The invention further utilizes, optionally, a solar collector loop or solar panels, either open or closed loop to provide additionally generated energy to provide heating of water in the cold water tank.

In yet in another preferred embodiment of the invention, the cold water tank holds just enough water to provide water to the WWHP at the incoming ambient temperature, 55° F. to 70° F. in moderate climates, from which it can extract 10° to 25° F. This heat is transferred by the heat pump to the hot water tank for use in the building.

As an option, solar thermal energy can be efficiently used by heating either the cold water to 70° F. or the hot water to 120° F.+based upon current state, demand and solar availability as determined by the controller. The solar can be introduced directly into the water by circulating potable water through a solar collector or by circulating a heat transfer fluid through a solar collector and heat exchanger in one of the tanks or the WWHP. Absent a solar collector loop, solar panel or other means of heating water, the present invention will provide only nominal output of heat in cases where the cold water stored in the cold water tank, or source water, is at a temperature of 55° F. or below. Further contemplated in the present invention is the use of a electronic thermal controller which acts to control the temperature of water contained in either or both the hot and cold water tanks following heating and cooling of the water by the water-to-water heat pumps. An electronic thermal controller will be understood by those in the art and will be any electronic device which assists in modulating temperature of the water contained in storage tanks within a desired temperature range.

In one embodiment both tanks are either pressurized or non-pressurized vessels whose sizes may vary according to anticipated demand. Pressurized vessels, especially those containing potable water, must meet strict codes and standards specified by a variety of authorities. Virtually any of these tank materials (ceramic lined steel, stainless steel, copper, stone) would be suitable for either tank. Non-pressurized vessels can be constructed of any appropriate material as well as plastic, fiberglass or sheet-lined tanks with "load side" heat exchangers used to transfer heat to and from the storage medium.

In yet another preferred embodiment of the invention, the cold water tank may be eliminated entirely being replaced by a source of water, such water being pumped through the heat exchanger controlled by a flow switch that switches on the heat pump whenever there is sufficient flow of the source water to collect heat to be delivered to the hot water tank. When sufficient flow of water is achieved, water will be drawn to the heat pump by means of a valve, electronic flow meter or other means known in the art.

Absent the optional solar collector loop, solar panel or other heating elements, the present invention may be utilized in a variety of domestic and business locations situated in temperate or tropical climates. Utilizing the optional solar heating source, there is no climate restriction in which the invention may be employed.

Reference is now made to FIGS. 1-10, which illustrate various embodiments of the invention.

FIG. 1 shows a cross section view of a simplified embodiment of the geothermal water heater of the present invention. Initially, water from a municipal or other source, enters the system via an entry line 14. This supply feeds the cold water holding tank, the hot water storage tank and the anti-scald valve to make best advantage of the geothermal heat from the source water. The cold water holding tank 15 (pressurized) is plumbed in-line between the source water and the cold water supply to the domestic or commercial dwelling. The size and volume of will be appropriate depending on the daily patterns of hot and cold water use. Likewise, a hot water storage tank 16 (pressurized) is situated vertically above the cold water tank 15 and is insulated and sized to match average daily demand and heat recovery rate. Upon entering the system, source water enters 14 and diverts to either the hot water tank inlet 22 or to the cold water tank inlet 20. Regarding the hot water tank inlet 22, the inlet uses a dip tube to deliver source temperature water to the bottom of the tank to promote stratification. For the cold water inlet 20, the inlet line is situated at the upper third of the tank, again to promote thermal stratification.

Figure 9:
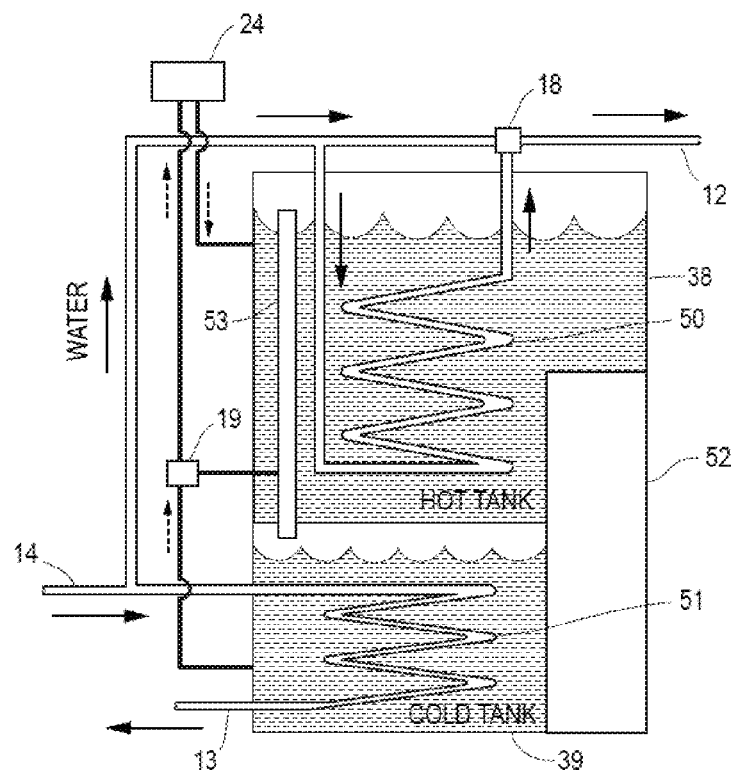
FIG. 9 shows how the vented tank configuration can incorporate an overflow line to permit transfer of the solar heat to either the cold or hot water tank with a single three-port diverter valve.
Figure 10A:
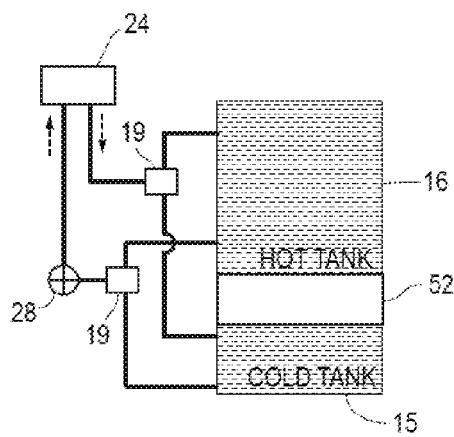
FIG. 10A depicts how the water in either pressurized tank may be heated directly in the solar array using a pair of three-port diverter valves.
Figure 10B:
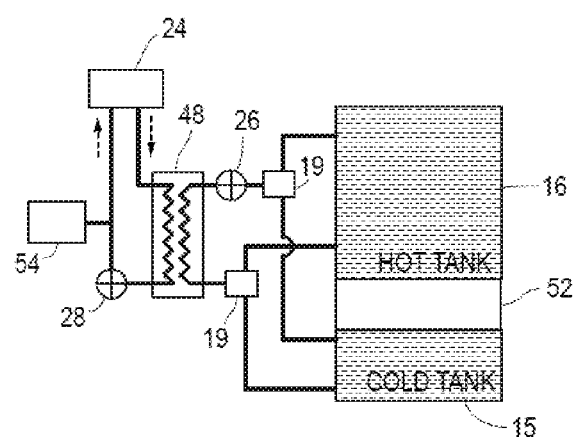
FIG. 10B shows that, if the solar system is an indirect design, the diverter valves would operate on the tank side of the heat exchanger.

FIGS. 9 and 10A and B, illustrate a motor controlled three-port valve(s) 19 to divert solar heated water both to and from the WWHP, for the purpose of supplying heated water to either the hot water tank or the cold water tank. By maintaining the cold tank at the highest desirable use temperature for cold water, the efficiency of the heat pump will be ideally high. When the solar can supply heat at or above the hot water temperature, the valve(s) divert the heat to the hot water tank allowing the heat pump to switch off completely. A solar fluid pump is also optionally situated in line prior to the solar collector(s) 24 which circulates solar heat transfer fluid (typically water or anti-freeze) between a solar array and the heat exchanger. Further, FIG. 10B shows a water-to-solar fluid heat exchanger that permits the hot and cold tanks to share the heat from the solar array to optimize solar heat collection potential 48.

As shown in FIG. 1, the system supplies the heated water to the domestic or commercial dwelling 12 the temperature of which is modulated by a mixing or anti-scald valve 18. The anti-scald or mixing valve will be known to the skilled individual and mixes hot and cold water with a thermostatic control, typically a bimetallic coil. The valve provides both a safety function as well as permitting storage of heated water in the hot water tank at temperatures above those generally allowed under standard safety guidelines. The valve 18 is fed heated water from the hot water tank 16 by an outlet line 23 placed in the upper third of the tank to promote thermal stratification. Likewise, the present invention comprises a water line which supplies a domestic or commercial dwelling with a cold water supply 13 which is drawn from the lower third of the cold water storage tank so to promote thermal stratification.

Figure 2:
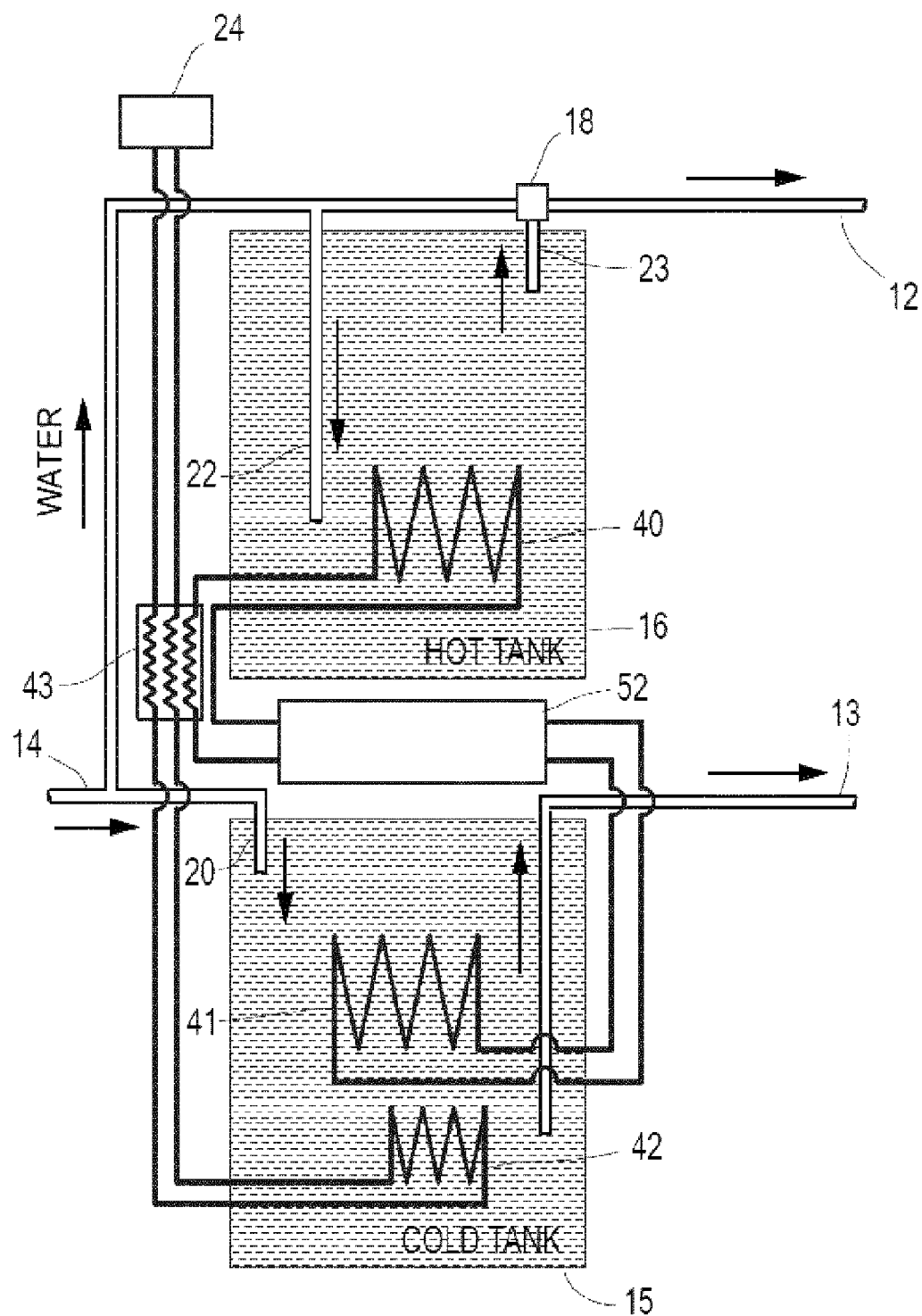
FIG. 2 depicts a Solar assisted configuration showing that solar heat can heat either tank through a heat exchanger placed directly in the tank or through a heat exchange interface with the heat pump refrigerant.

FIG. 2 shows a solar thermal collector 24. As discussed above and shown in FIGS. 3, 4 and 5, an expansion valve 25 or capillary allows release of compressed refrigerant to absorb heat from the cold water tank while a hot water circulator 26 and cold water circulator 27 circulate to move heat, via the heat pump, to the hot and cold water storage tanks respectively. FIG. 2 further illustrates a solar fluid heat exchanger 43 containing a circuit for potable water and another, separate circuit for refrigerant. The exchanger may be a "tube-in-shell", "plate type", "concentric tubing", "parallel-tubing", or any other appropriate configuration as is known in the art that provides adequate heat transfer. In addition, FIG. 2 illustrates a solar heat transfer fluid heat exchanger for the cold water tank 42.

Figure 3:
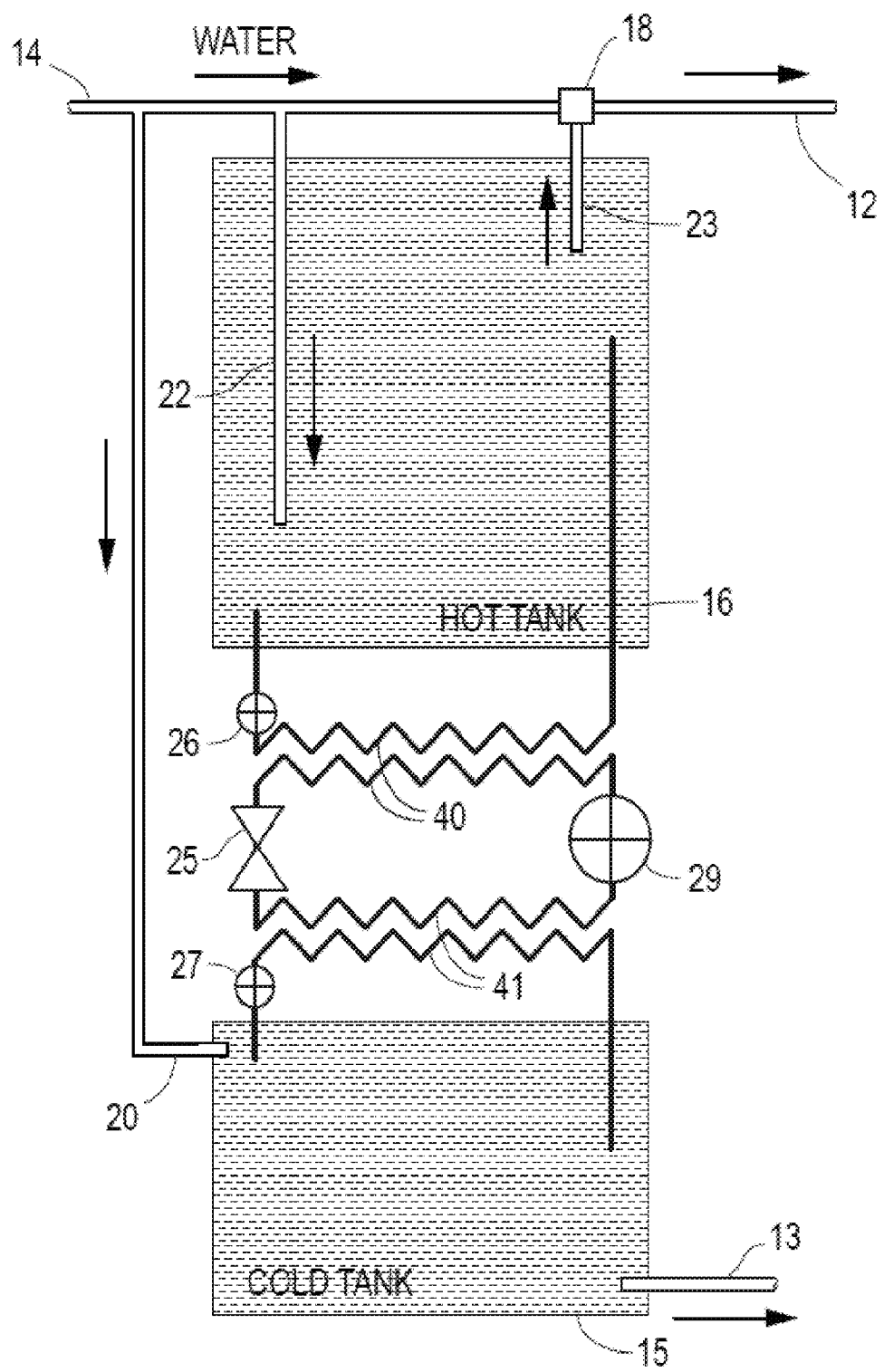
FIG. 3 depicts the basic configuration with the water-to-refrigerant transfer occurring within the heat pump module.
Figure 4:
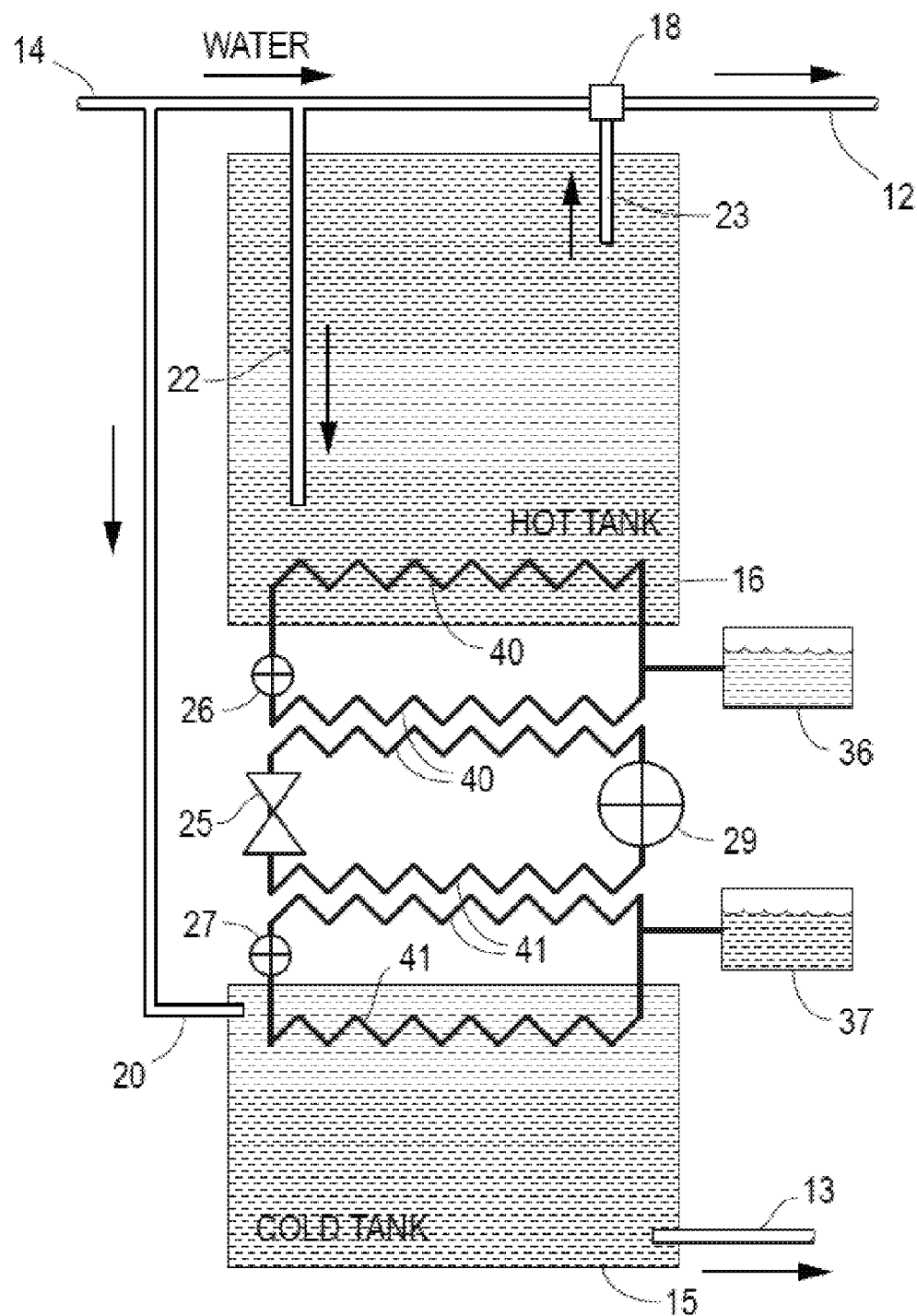
FIG. 4 depicts a configuration that provides for heat exchange via a heat transfer fluid with heat exchangers in both the tank and the heat pump module.
Figure 5:
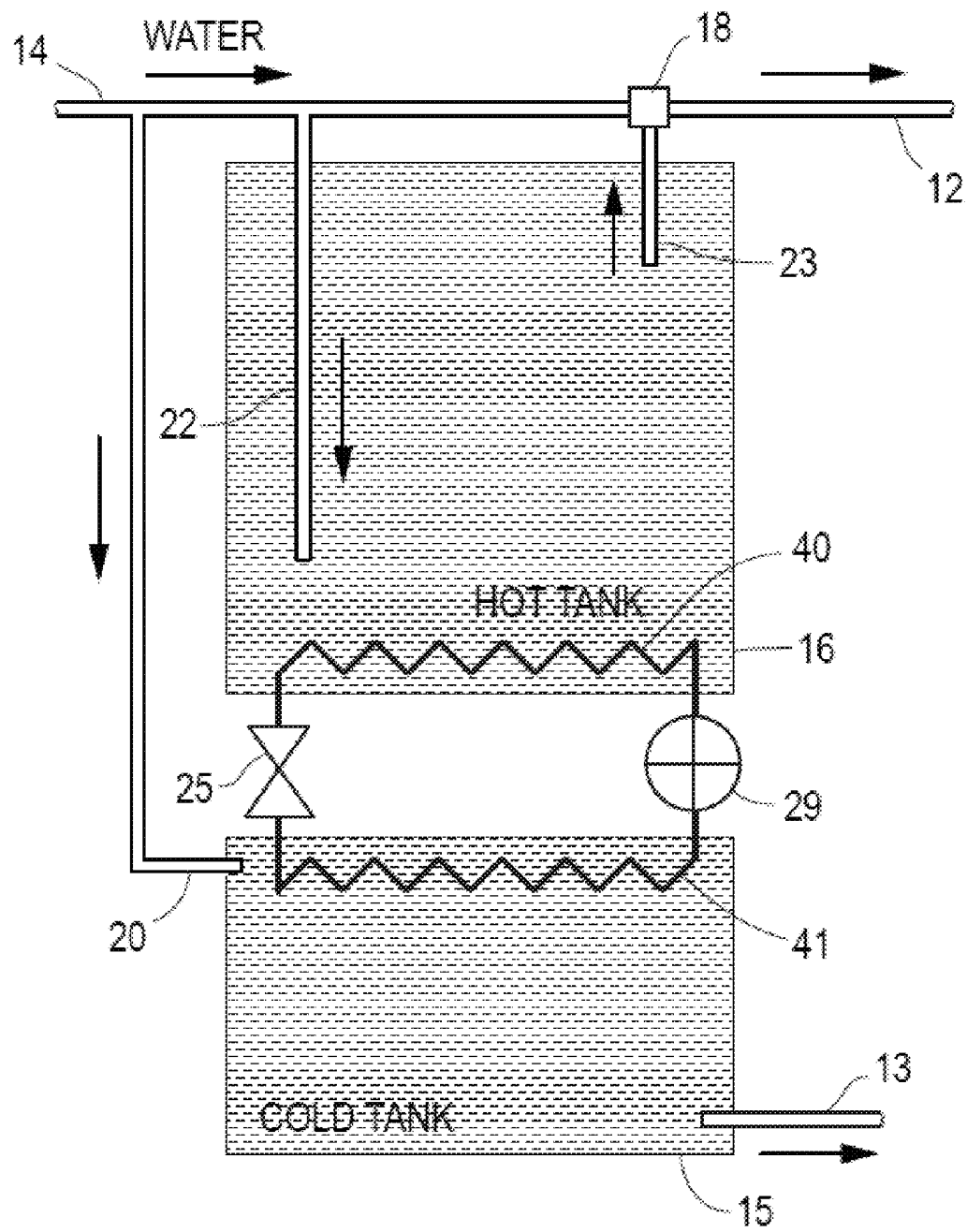
FIG. 5 depicts a design using a heat exchanger in the hot and cold tanks carrying the refrigerant directly from the compressor or expansion valve.
Figure 6:
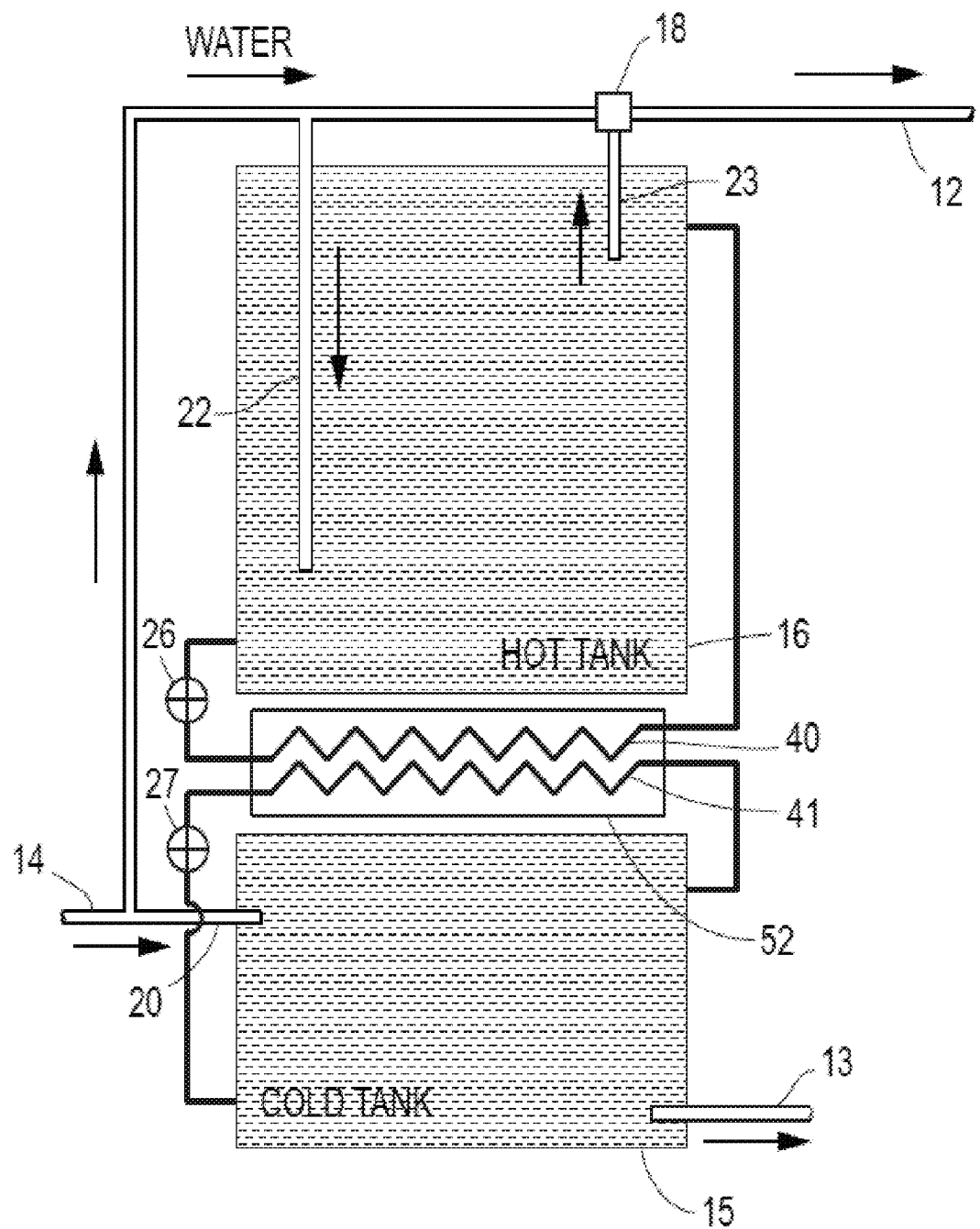
FIG. 6 depicts a thermoelectric heat pump with hot and cold water heat exchangers on either side of the thermoelectric layers to transfer the heat between tanks. Using a thermoelectric heat pump would require a hot and cold water heat exchanger on either side of the thermoelectric layers.

According to a preferred embodiment of the invention, as shown in FIGS. 3, 4 and 5, a compressor 29 acts to condense refrigerant which releases the heart absorbed on the evaporator side of the heat pump as previously described. An expansion tank 36 for the hot side heart transfer fluid will be required if the heat exchanger on the hot tank side of the invention is configured in a closed loop. Likewise, an expansion tank 37 for the cold side heart transfer fluid will be necessary if the heat exchanger on the cold side is part of a closed loop configuration.

Figure 8:
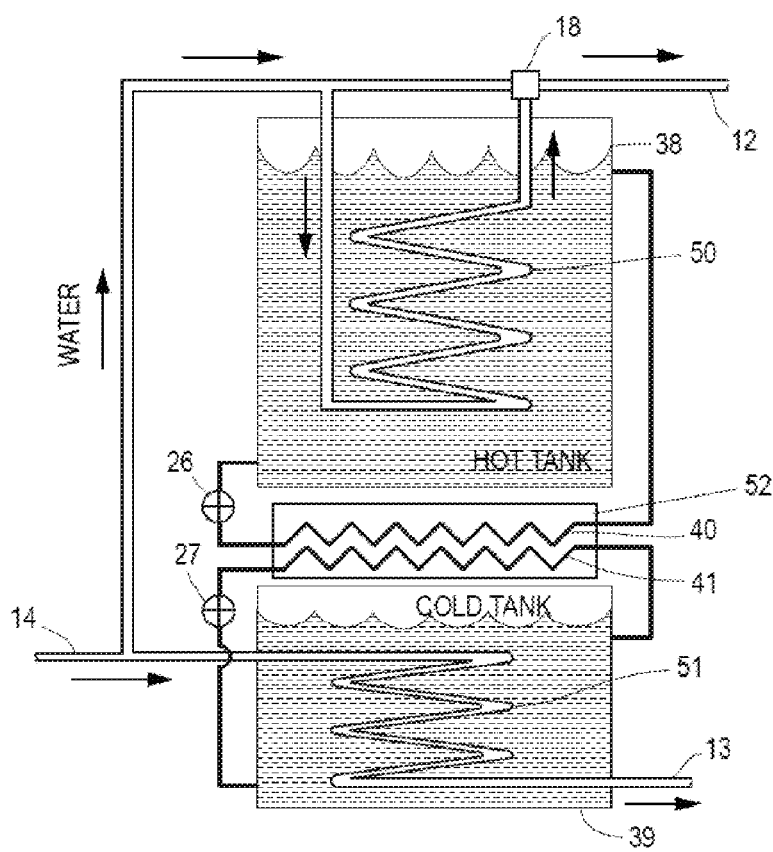
FIG. 8 illustrates the use of atmospherically vented (pressureless) tanks containing a heat transfer medium (such as water) to be used with the potable water contained inside an immersed load-side heat exchanger in the tank to transfer heat to or from the surrounding medium.

Also shown in FIGS. 8 and 9, comprising the invention is an atmospherically vented cold water heat transfer vessel 39 containing a heat transfer medium to hold heat from source water that may or may not receive supplemental heat. Likewise, an atmospherically vented hot water heat vessel 38 containing a heat transfer medium to release heat to source water that may or may not receive supplemental heat.

A hot water heat exchanger 40 containing a circuit for potable water and another for refrigerant. May be tube-in-shell type, plate type, concentric tubing or other configuration to provide adequate heat transfer. Likewise, as contemplated by the present invention is cold water heat exchanger 41 containing a circuit for potable water and another for refrigerant. May be tube-in-shell type, plate type, concentric tubing or other configuration to provide adequate heat transfer.

Figure 7:
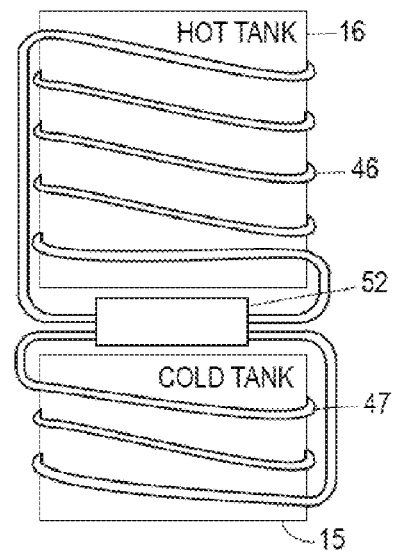
FIG. 7 depicts how the heat can be effectively transferred using external wrap-around heat exchangers on either tank.

In yet another embodiment of the invention, as illustrated in FIG. 7, are external hot 46 and cold 47 water heat exchangers. The external hot water heat exchanger 46 wraps around the hot water tank to transfer heat from the refrigerant to the hot water. Likewise, the external cold water heat exchanger 47 wraps around the cold water tank to transfer the heat from the cold water to the refrigerant.

In yet another preferred embodiment, FIGS. 8 and 9 illustrate an immersed load-side hot water heat exchanger 50 which contains the potable water under line pressure to absorb heat from the surrounding heat transfer fluid held in the tank at atmospheric pressure. Likewise, a preferred embodiment possesses an immersed load cold water heat exchanger 51 which contains the potable water under line pressure to release heat to the surrounding heat transfer fluid held in the tank at atmospheric pressure.

FIGS. 6-10 illustrate alternative embodiments and configurations for water-to-water heat pumps of the present invention which connect cold water and hot water tanks to chill cold water to provide heat for hot water 52. In utilizing the optional solar collector loop or solar panel, FIG. 10B depicts an overflow 54 which is activated when solar power draws from the cold water tank which creates a return of hot water to the cold water tank when necessary.

Geothermal heating and cooling systems use the natural constant ambient temperature of the earth to heat in the winter and cool in the summer. This is accomplished with a compressor or heat pump unit, the liquid heat exchanger medium, and the air delivery system. Quite simply, geothermal systems in heating take heat from the earth, transfer that heat to a refrigerant then distribute the heat into the structure with a forced-air or hydronic system. In cooling, geothermal systems take heat from the structure, transfer the heat to the refrigerant, then transfer the heat back to the water or loop fluid. This works the same as a standard air conditioner, except a geothermal system uses water or loop fluid at a constant temperature (average 50 degrees) instead of varying outdoor temperature.

Open loop systems use water from a well. Well water is pumped to the geothermal unit, where heat is either taken from it (heating) or put into it (cooling). There is no change to the water, or contamination, other than a slight change in temperature. Generally speaking, geothermal systems require 1.5 gpm per ton of air conditioning. Most homes would use between 4 and 6 gallons per minute while the system is running. This is the least expensive source for a geothermal system, and works quite well when there is sufficient water quality and quantity, and there is a place to "discharge" the water such as a drain, ditch, stream, or pond.

Closed loop systems are the second most common type of geothermal source. Closed loops utilize polyethylene piping buried or drilled into the ground, filled with a water/antifreeze solution. The loop fluid circulating in this closed piping system absorbs heat or rejects heat into the surrounding earth. Typically, in the Midwest, loop systems are installed in a "horizontal" configuration as pictured above. In other parts of the country, where digging is more difficult or expensive, "vertical" loops are used.

Vertical loops are placed in vertical holes usually drilled in the ground with a machine similar to a drill rig used to install water wells. Vertical loops are also commonly used in commercial applications or applications where there is not enough room for a horizontal loop. Closed loops are virtually maintenance free, and since they re-circulate the same fluid, have no need for a well or a place to discharge the water. However, closed loops, due to the excavation costs, are generally more expensive than open loop systems.

With regard to the optional solar heating loop, generally there are several main components of an active solar water heating system. The components include but are not limited to, a solar collector which collects solar energy and transfer the captured energy to the coolant medium. It also includes a circulation system which acts to move the fluid between the solar collector and a storage tank. Optionally, the solar water heating system may include a backup heating system and a control system to regulate the system operation.

The two main types of solar water heating systems are the closed loop system and the open loop system. The open loop system uses water as the coolant wherein the water circulates between the solar collector and the storage tank. There are two main types of closed loop system these are the drainback system and the re-circulating system, the main principle behind both systems is the activation of circulation from the collector to the storage tank when the temperature within the solar collector reaches a certain value.

In the drainback system a valve is used to allow the solar collector to fill with water when the collector reaches a certain temperature. In the re-circulating system water is pumped through the collector when the temperature in the storage tank reaches a certain critical value.

An emerging area in which the invention may be applied in the present invention is the field of thermoelectric energy and power. In a preferred embodiment, the present invention will incorporate use of a thermoelectric heat pump. Thermoelectricity refers to a class of phenomena in which a temperature difference creates an electric potential or an electric potential creates a temperature difference. As used herein, the terms thermoelectricity, thermoelectric energy and thermoelectric power, refer collectively to the Seekbeck effect, Peltier effect, and the Thomson effect. Recently thermoelectricity has seen rapidly increasing usages in applications like portable refrigerators, beverage coolers, electronic component coolers, metal alloy sorting devices etc. One of the most commonly used materials in such application is bismuth telluride ($Bi_2Te_3$), a compound of bismuth and tellurium. It is a contemplation of the present invention to utilize thermoelectric heat pumps for the purpose of transferring heat.

Bismuth telluride is a narrow gap layered semiconductor with a trigonal unit cell. The valence and conduction band structure can be described as a many-ellipsoidal model with 6 constant-energy ellipsoids that are centered on the reflection planes. $Bi_2Te_3$ cleaves easily along the trigonal axis due to Van der Waals bonding between neighboring tellurium atoms. As a result, bismuth telluride based material that is used for power generation or cooling applications must be polycrystalline. Furthermore, the Seebeck coefficient of bulk $Bi_2Te_3$ becomes compensated around room temperature, forcing the materials used in power generation devices to be an alloy of bismuth, antimony, tellurium, and selenium. It will be understood by those skilled in the art that other alloys may be appropriate for generating thermoelectric energy and that such alloys are within the scope of the present invention.

In applications where there is likely to be a temperature drop below zero degrees then it is necessary to use a closed loop system. The main difference pertaining to the open loop system is the water is replaced with a coolant which will not freeze in the temperature range which the solar collector may be subject to. The coolant will usually be refrigerant, oil or distilled water. Closed loop systems are generally more costly than their open loop counter parts and great care must be taken to avoid contamination of the water with refrigerant. The energy captured by the coolant is then transferred to the hot water via a heat exchanger.

In a drainback system the coolant may be plain tap water. The system works on the principle that there is only water in the collector when the pump is operating. This has the benefit that the coolant used in the system will not have the chance to freeze or overheat under stagnation (no circulation) conditions which can cause damage to the array and turns antifreeze acidic. The only necessary feature on the drainback system is that the solar collector is elevated and the piping continuously downhill to the drainback tank in order for the coolant to flow out of the collector. This system again works on the principle that the water is circulated between the collector and the drainback tank when the designated temperature is reached between the solar collector and the hot water.

Certain advantages can be obtained in utilizing the present invention including maximizing efficiency for transfer of heat due to the inherent efficiency of water-to-water transfer. The present invention utilizes geothermal energy and saves on energy costs above what is currently known in the art. For example, an overall lower operating cost to heat water is realized in practicing the present invention. Typically, electric water heaters are relatively expensive to operate, $60.00 to $120.00 per month for a family in most U.S. geographic areas. The present water heater will cost about one-fourth of this amount and will be approximately equal to that of a natural gas water heater costs to operate. In addition, utilizing geothermal technology provides a ubiquitous fuel source. When it is available, natural gas is a popular choice of fuel for water heating because it costs less than electricity. However, natural gas is not available in all areas and requires a costly infrastructure improvement to add to a community. The present invention addressed this critical need.

Another advantage is utilizing the present invention is a largely reduced carbon footprint. Natural gas water heaters unavoidably create $CO_2$, on average: 2200 lbs per year per unit. Standard electric water heaters create from 6,000 lbs (for coal fired) to zero lbs per year if powered with carbon-free fuel, like solar. The present invention would produce less than a fourth of the amount produced by electric water heaters.

In addition, at one-fourth the electric demand, it can cost less to power the geothermal water heater with photovoltaic panels as part of a grid connected PV system than to install a separate solar thermal system for water heating.

In realizing yet another advantage, the present invention will provide residents and commercial establishments in tropical and desert climates chilled cold water at 45°-50° F. for purposes of drinking and bathing. Further, designs using a solar thermal heat source are also possible with the effect of significantly increasing solar performance by both decreasing the electric backup used and lowering the solar panel operating temperature.

The present invention is also easily adapted to operate and install in any domestic or commercial dwelling or establishment. The present device may be installed in place of most natural gas water heaters due to the lower electric service requirement for the heat pump which can operate on a standard 15 A-120V circuit. Otherwise, changing to electric water heating would require the installation of at least a 20 A-240V circuit, if available.

Although the invention has been described with reference to the above example, it will be understood that modifications and variations are encompassed within the spirit and scope of the invention. Accordingly, the invention is limited only by the following claims.

What is claimed is:

1. A geothermal heat pump water heater system comprising, an open loop system that draws water from an outside water source, a hot water tank, a cold water tank, at least one water-to-water heat pump (WWHP), the water-to-water heat pump comprising one or more heat exchangers that transfer latent heat from water drawn directly from said outside water source, wherein said water is supplied to both the hot water tank and the cold water tank, said heat exchangers comprising a cold water side heat exchanger and a hot water side heat exchanger, wherein water entering the cold water tank is cooled by the cold water side heat exchanger and returned to the cold water tank to be used for domestic or commercial purposes and wherein water entering the hot water tank is supplied to a hot water side heat exchanger, the heated water being returned to the hot water tank to be used for domestic or commercial purposes.

2. The geothermal heat pump water heater system of claim 1, further comprising a means for providing a supplemental heating capacity for heating water in the cold and hot water tanks.

3. The geothermal heat pump water heater system of claim 2, wherein said supplemental heating is provided to the cold or hot water tanks by a solar collector loop or solar panel.

4. The geothermal heat pump water heater system of claim 1, wherein said water source provides the system with at least three times the volume of the water than the volume of water to be heated.

5. The geothermal heat pump water heater system of claim 1, wherein water entering the cold water tank is supplied to the cold water side heat pump by flow or a circulator and cooled by refrigerant released by an expansion valve.

6. The geothermal heat pump water heater system of claim 1, wherein water entering the hot water tank is supplied to the heat pump by a circulator and is heated by compressed refrigerant before being released by an expansion valve.

7. The geothermal heat pump water heater system of claim 1, wherein, said cold water side heat exchanger captures heat from surrounding air.

8. The geothermal heat pump water heater system of claim 1, wherein the temperature of water returned to the hot and cold water tanks is maintained by an electronic thermal controller.

9. The geothermal heat pump water heater system of claim 1, wherein the system lacks a cold water tank and wherein source water is drawn from an outside water source that flows directly to the heat exchangers the system further comprising, a switch means that activates the heat pump when sufficient water flow exists to collect heat.

10. A geothermal heat pump water heater system comprising, an open loop system that draws water from an outside water source, a hot water tank, a cold water tank and at least one thermoelectric water-to-water heat pump (WWHP), wherein said system draws said water directly from an outside water source, said water being supplied to both the hot water tank and the cold water tank, wherein water entering the cold water tank is cooled by the thermoelectric WWHP and returned to the cold water tank to be used for domestic or commercial purposes and water entering the hot water tank is heated by the thermoelectric WWHP and returned to the hot water tank to be used for domestic or commercial purposes.

11. A method of heating water utilizing geothermal energy comprising, an open loop system that draws water from an outside water source, a hot water tank, a cold water tank, at least one water-to-water heat pump (WWHP), the water-to-water heat pump comprising one or more heat exchangers that transfer latent heat from said water drawn directly from the outside water source, wherein said water entering the heater system is supplied to both the hot water tank and the cold water tank, wherein water entering the cold water tank is supplied to a cold water side heat pump by a circulator and pumped to a cold water side heat exchanger and cooled further by cooled refrigerant released by an expansion valve, the cooled water returning to the cold water tank to be used for domestic or commercial purposes and wherein water entering the hot water tank is supplied to a heat pump by a circulator and is pumped to a hot water side heat exchanger, wherein compressed refrigerant heats the water, the heated water returning to the hot water tank to be used for domestic or commercial purposes.

12. The method of claim 11, further comprising a means for providing a supplemental heating capacity for heating water in the cold and hot water tanks.

13. The method of claim 12, wherein said supplemental heating is provided by a solar collector loop or solar panel.

14. The method of claim 11, wherein the temperature of water returned to the hot and cold water tanks is maintained by an electronic thermal controller.

15. The method of claim 11, wherein the source water is heated in a heater system which lacks a cold water tank and wherein source water is drawn from an outside source that flows directly to the heat exchangers the system further comprising a switch means that activates the heat pump when sufficient water flow exists to collect heat.

16. The method of 11 wherein, said source water is heated utilizing a thermoelectric water-to-water heat pump (WWHP).

* * * * *